US012749479B2

(12) United States Patent
Kogami

(10) Patent No.: US 12,749,479 B2
(45) Date of Patent: Sep. 29, 2026

(54) COMMUNICATION SUPPORT SYSTEM, COMMUNICATION SUPPORT METHOD, AND NON-TRANSITORY RECORDING MEDIUM

(71) Applicant: Kazuhiko Kogami, Kanagawa (JP)

(72) Inventor: Kazuhiko Kogami, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 202 days.

(21) Appl. No.: 18/395,775

(22) Filed: Dec. 26, 2023

(65) Prior Publication Data

US 2024/0212670 A1 Jun. 27, 2024

(30) Foreign Application Priority Data

Dec. 27, 2022 (JP) ................................ 2022-209685

(51) Int. Cl.

| | |
|---|---|
| ***G10L 15/26*** | (2006.01) |
| ***G06F 3/0484*** | (2022.01) |
| ***G06F 9/451*** | (2018.01) |
| ***G08B 21/24*** | (2006.01) |
| ***G10L 15/08*** | (2006.01) |
| ***G10L 15/22*** | (2006.01) |

(52) U.S. Cl.

CPC ............ *G10L 15/08* (2013.01); *G06F 3/0484* (2013.01); *G08B 21/24* (2013.01); *G10L 15/22* (2013.01); *G10L 2015/088* (2013.01)

(58) Field of Classification Search

None

See application file for complete search history.

(56) References Cited

U.S. PATENT DOCUMENTS

| | | | | |
|---|---|---|---|---|
| 7,672,845 | B2 * | 3/2010 | Beranek | G06F 16/3334 379/265.09 |
| 9,160,853 | B1 * | 10/2015 | Daddi | H04M 3/5175 |
| 9,195,312 | B2 * | 11/2015 | Itoh | H04N 7/15 |
| 11,128,483 | B1 * | 9/2021 | Surazski | G06V 20/30 |
| 11,710,509 | B1 * | 7/2023 | Bhupati | H04L 65/403 386/282 |
| 2014/0294167 | A1 * | 10/2014 | Kim | H04M 1/724 379/142.17 |
| 2015/0215464 | A1 * | 7/2015 | Shaffer | G10L 15/1815 379/266.06 |
| 2016/0301639 | A1 * | 10/2016 | Liu | H04L 51/046 |
| 2019/0361934 | A1 * | 11/2019 | Rogynskyy | G06Q 10/107 |
| 2022/0179665 | A1 * | 6/2022 | Rathod | G06F 9/451 |
| 2023/0343330 | A1 * | 10/2023 | Machanavajhala | G10L 15/26 |

* cited by examiner

*Primary Examiner* — Seong-Ah A Shin
(74) *Attorney, Agent, or Firm* — XSENSUS LLP

(57) ABSTRACT

A communication support system includes circuitry configured to manage one or more keywords; acquire audio of one or more participants in a communication; determine, by analyzing the audio, whether or not each of the one or more keywords is made in the communication; and in a case that the circuitry determines that a keyword of the one or more keywords has not been made in the communication, notify a participant of the one or more participants before the communication is ended that the keyword has not been made in the communication.

14 Claims, 16 Drawing Sheets

COMMUNICATION SUPPORT SYSTEM, COMMUNICATION SUPPORT METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Applications No. 2022-209685, filed on Dec. 27, 2022, in the Japan Patent Office, the entire disclosure of which is hereby incorporated by reference herein.

BACKGROUND

Technical Field

The present disclosure relates to a communication support system, communication support method, and non-transitory recording medium.

Background Art

Meeting systems that send and receive content data such as video or audio between multiple terminals are becoming popular. In addition, compliance check systems are known to check for both the presence or absence of "prohibited expressions" and whether or not "necessary items" are included, based on data such as the content of explanations given to customers during business negotiations or sales activities.

SUMMARY

According to one embodiment, a communication support system comprises circuitry configured to manage one or more keywords; acquire audio of one or more participants in a communication; determine, by analyzing the audio, whether or not each of the one or more keywords is made in the communication; and in a case that the circuitry determines that a keyword of the one or more keywords has not been made in the communication, notify a participant of the one or more participants before the communication is ended that the keyword has not been made in the communication.

According to one embodiment, a communication support method comprises managing one or more keywords; acquiring audio of one or more participants in a communication: determining, by analyzing the audio, whether or not each of the one or more keywords is made in the communication; and in a case that the determining indicates that a keyword of the one or more keywords has not been made in the communication, notifying a participant of the one or more participants before the communication is ended that the keyword has not been made in the communication.

According to one embodiment, a non-transitory computer readable medium storing computer executable instructions which, when executed by circuitry of a communication support system, cause the communication support system to perform a process comprising managing one or more keywords; acquiring audio of one or more participants in a communication: determining, by analyzing the audio, whether or not each of the one or more keywords is made in the communication; and in a case that the determining indicates that a keyword of the one or more keywords has not been made in the communication, notifying a participant of the one or more participants before the communication is ended that the keyword has not been made in the communication.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
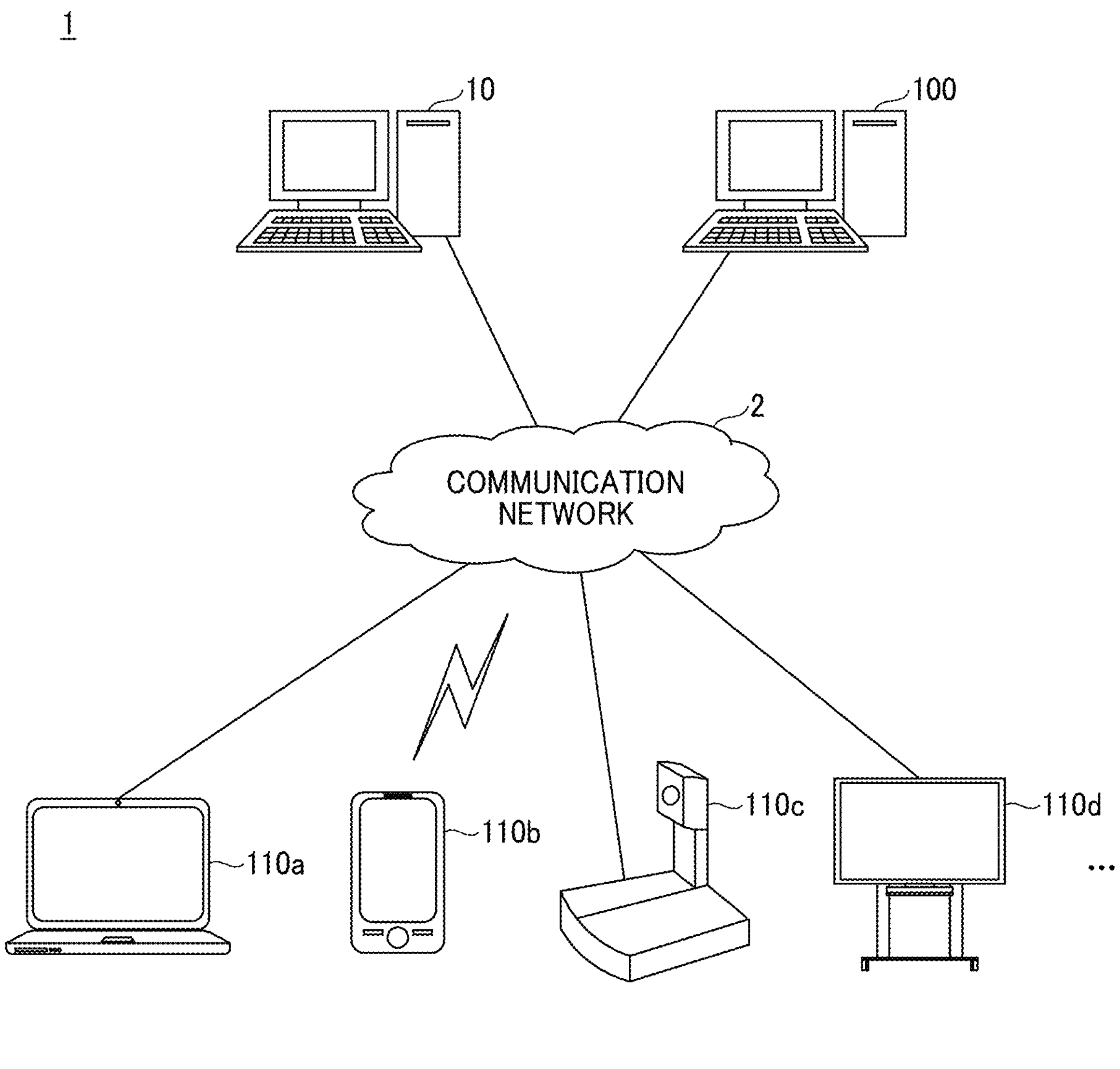
FIG. 1 is a diagram illustrating an example of the system configuration of the communication support system according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

FIG. 1 is a diagram illustrating an example system configuration of a communication support system according to embodiments of the present disclosure. The communication support system 1, as an example, includes a meeting server 10, a communication support apparatus 100, and a plurality of terminals 110*a*, 100*b*, 100*c*, 100*d*, etc., connected to a communication network 2 such as the Internet or a Local Area network (LAN). In the following description, “terminal 110” is used to indicate any terminal among the plurality of terminals 110*a*, 100*b*, 100*c*, 100*d*. The number of terminals 110 shown in FIG. 1 is an example, and the number of terminals 110 may be two or more.

The communication support system 1 is a system for supporting various types of communication, such as business meetings, meetings, medical treatment, classes, or counseling, where at least audio is sent and received between the terminal 110 and one or more other terminals 110. As an example of communication supported by the communication support system 1, the following explanation is provided for web meeting, in which business discussions are conducted by sending and receiving video images including audio between a user of terminal 110 and a user of other terminal 110.

The terminal 110 is a general-purpose information terminal device used by users participating in the web meeting such as a Personal Computer (PC), tablet terminal, or smartphone, for example. Alternatively, the terminal 110 may be an electronic device with web meeting capabilities, such as a video meeting device or an Interactive White Board (IWB). Here, IWB is a white board with electronic blackboard functions that can communicate with each other, also called an electronic blackboard. As an example, the following explanation is given for the case where the terminal device 110 is a general-purpose information terminal.

Participants in a web meeting can participate in a web meeting by accessing a meeting address provided by the meeting server 10 using, for example, a web meeting application installed on the terminal 110 or a web browser.

The meeting server 10 is, for example, an information processing device having a computer configuration, or a system including multiple computers. The meeting server 10 provides a web meeting service that sends and receives audio, or video including audio, between multiple terminals 110. The web meeting service provided by the meeting server 10 may be any web meeting service.

The communication support apparatus 100 is, for example, an information processing apparatus having a computer configuration, or a system including multiple computers. The communication support apparatus 100 provides the communication support service according to this embodiment.

Figure 2:
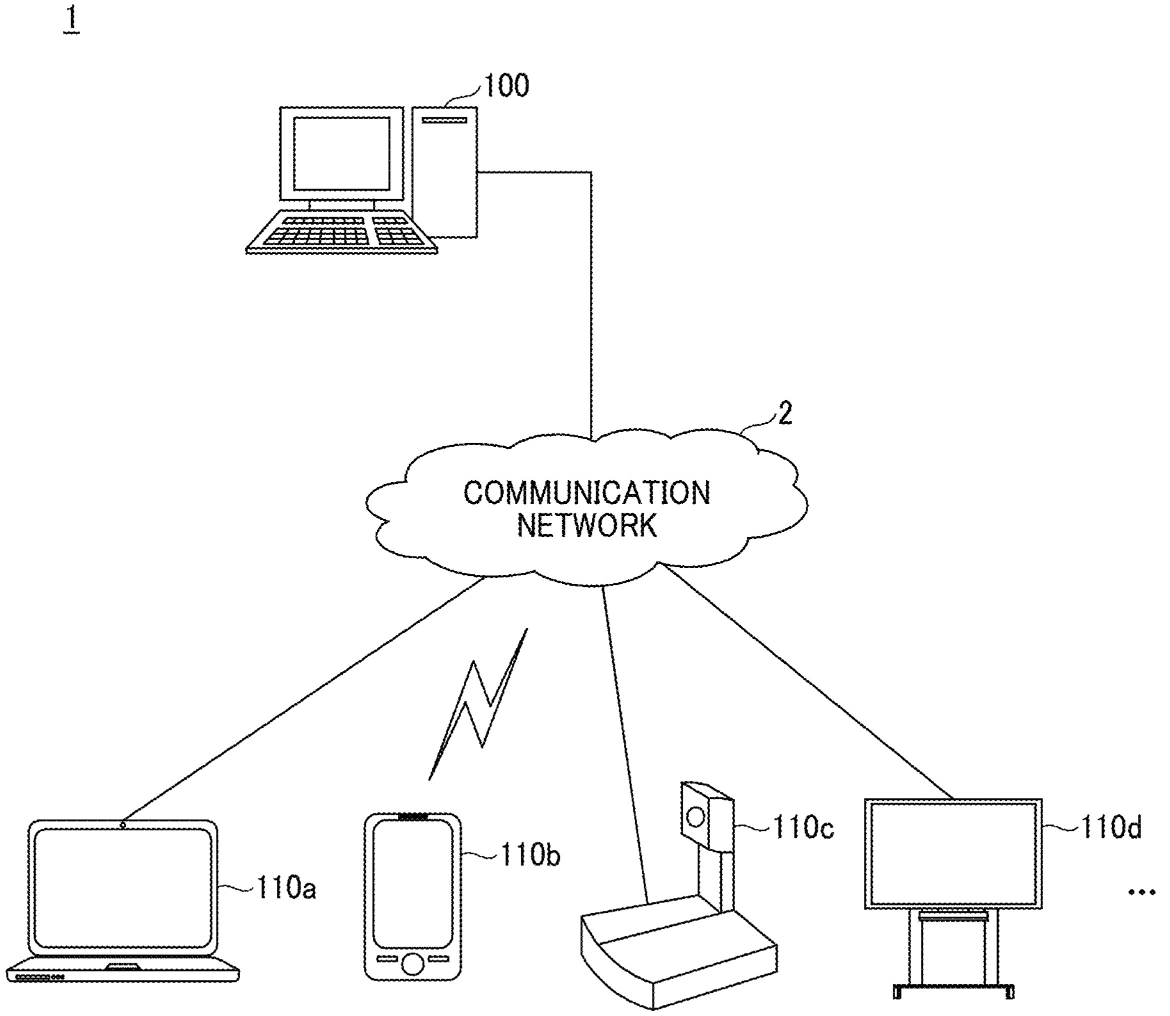
FIG. 2 is a diagram illustrating another example of the system configuration of the communication support system according to embodiments of the present disclosure.

The system configuration of the communication support system 1 shown in FIG. 1 is an example. For example, the communication support system 1 may have the communication support apparatus 100 providing the functions of the meeting server 10, as shown in FIG. 2. At least some or all of the communication support services provided by the communication support system 1 may be provided by the terminal 110. The following explanation is based on the case where the communication support system 1 has the system configuration shown in FIG. 1.

(Overview of Communication Support Service)

For example, the following is a case in which a participant using terminal 110*a* conducts a business meeting (an example of communication) with other participant using terminal 110*b* via a web meeting provided by meeting server 10. In addition, there are important matters that participants should review during this business meeting. However, in an actual business meeting, the participant may end the web meeting without noticing that he/she forgot to talk or ask about an important matter.

Therefore, the communication support system 1 has a function to manage keywords related to important matters. For example, before a business meeting, the communication support system 1 receives settings such as keywords related to important matters to be confirmed in the meeting.

The communication support system 1 also has a function to acquire audio of participant and other participants in a business meeting. For example, the communication support system 1 uses a predetermined application program (hereinafter referred to as “application”) executed by the terminal 110*a* to acquire the participant audio and the other participants audio from the terminal 110*a*.

Furthermore, the communication support system 1 analyzes the acquired audio, and if the word related to the keywords is not made in the business meeting, the communication support system 1 has a function to remind the participants about the keywords before the business meeting ends. As an example, the communication support system 1 notifies the participants of a reminder regarding the keywords if the word concerning the keywords was not made at the business meeting within a predetermined time (e.g., 5 minutes before the scheduled end time of the meeting).

In this way, the communication support system 1 notifies participants of reminders when they have not confirmed important matters during a business meeting, so that participants can confirm important matters without talking or asking during the meeting.

Thus, according to the present embodiment, it is possible to provide a communication support system that prevents communication from ending without realizing that there are things that have been forgotten to talk or ask.

Here, communication is communication between a participant using terminal 110 and other participants using other terminal 110, where at least audio is sent and received. The communication includes, for example, business meetings, meetings, medical care, classes, or counseling using web meeting. However, it is not limited to this, and the communication may also be an audio (real voice) conversation between a participant using the terminal 110 and other participants, for example.

Keywords are words or phrases to be reminded, and include, for example, a string of words or phrases that the participant using the terminal 110 has registered with the communication support system 1. However, this is not limited to this, and the keywords may also include strings of words, phrases, etc. that have been pre-registered with the communication support system 1, for example, according to the type of communication, etc.

<Hardware Configuration>

(Hardware Configuration of a Computer)

Figure 3:
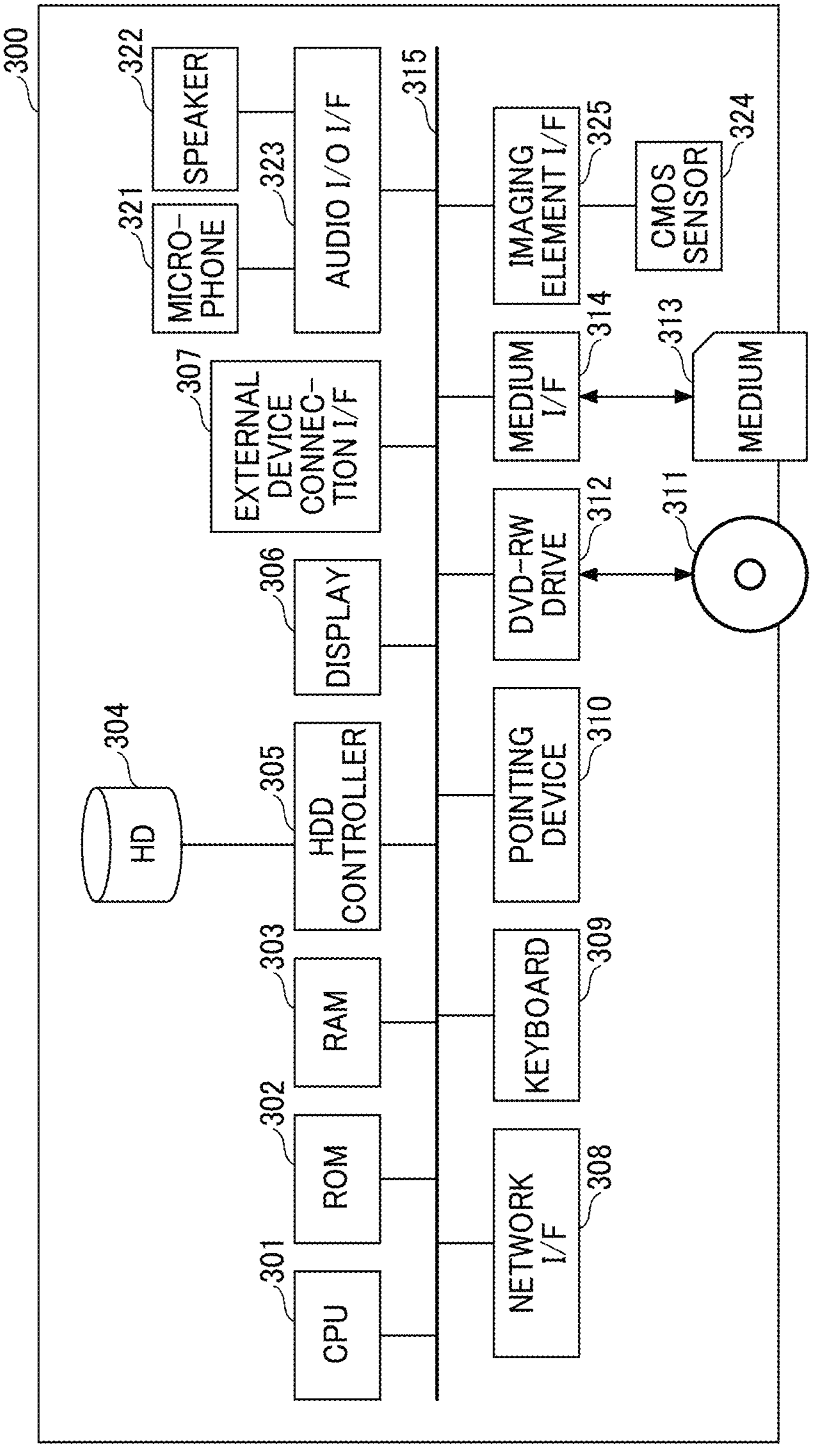
FIG. 3 is a diagram illustrating an example of the hardware configuration of the computer according to embodiments of the present disclosure.

The meeting server 10 and the communication support apparatus 100 have a hardware configuration of a computer 300, for example, as shown in FIG. 3. Alternatively, the meeting server 10 or communication support apparatus 100 is configured with multiple computers 300. The terminal 110 has a hardware configuration of a computer 300 as shown in FIG. 3, as an example.

FIG. 3 is a diagram illustrating an example of a hardware configuration of a computer according to embodiments of the present disclosure. As shown in FIG. 3, for example, the computer 300 includes a Central Processing Unit (CPU) 301, Read Only Memory (ROM) 302, Random Access Memory (RAM) 303, Hard Disk (HD) 304, Hard Disk Drive (HDD) controller 305, and Hard Disk Drive (HDD) 306. Disk Drive (HDD) controller 305, display 306, external device connection interface (I/F) 307, network I/F 308, keyboard 309, pointing device 310, Digital Versatile Disk Rewritable (DVD-RW) drive 312, medium 313, medium I/F 314, and bus lines 315.

When computer 300 is terminal 110, computer 300 is further equipped with microphone 321, speaker 322, audio input/output (I/O) I/F 323, Complementary Metal Oxide Semiconductor (CMOS) sensor 324, and imaging element I/F 325, etc.

Among these, CPU 301 controls the operation of the entire computer 300. In an exemplary implementation, CPU 301 may include or be encompassed by circuits, processing circuits or processing circuitry, which will be discussed later. The ROM 302 stores programs used to start the computer 300, such as an Initial Program Loader (IPL). The RAM 303 is used as a work area for CPU 301, for example. The HD 304 stores programs such as operating systems (OS), applications, device drivers, and various data. The HDD controller 305, for example, controls the reading and writing of various data to the HD 304 according to the control of the CPU 301. The HD 304 and the HDD controller 305 are examples of storage devices.

The display 306 displays various types of information, for example, cursors, menus, windows, text, or images. The display 306 may be external to the computer 300. The external device connection I/F 307 is an interface for connecting various external devices to the computer 300. The network I/F 308 is an interface for connecting the computer 300 to a communication network 2 to communicate with other devices.

The key board 309 is a type of input device equipped with a plurality of keys for inputting characters, numerical values, and various instructions. The pointing device 310 is a type of input device for selecting and executing various instructions, selecting processing targets, and moving the cursor. The key board 309 and the pointing device 310 may be provided outside the computer 300.

The DVD-RW drive 312 controls the reading or writing of various data to the DVD-RW 311 as an example of a removable recording medium. The DVD-RW 311 is not limited to DVD-RW, but may be any other removable recording medium. The medium I/F 314 controls reading or writing (storage) of data to medium 313 such as flash memory. The bus line 315 includes address buses, data buses, and various control signals, etc. to electrically connect the above components.

The microphone 321 is a built-in circuit that converts sound into electrical signals. The speaker 322 is a built-in circuit that converts electrical signals into physical vibrations to produce sounds such as music and voice. The audio I/O I/F 323 is a circuit that processes the input and output of audio signals to/from microphone 321 and speaker 322 in accordance with the control of CPU 301.

The CMOS sensor 324 is a kind of built-in image capturing device that captures a subject (e.g., a self-portrait image) and obtains image data in accordance with the control of the CPU 301. The computer 300 may have an imaging device such as a Charge Coupled Device (CCD) sensor instead of the CMOS sensor 324. The imaging element I/F 325 is a circuit that controls the drive of the CMOS sensor 324.

(Hardware Configuration of Terminal)

Figure 4:
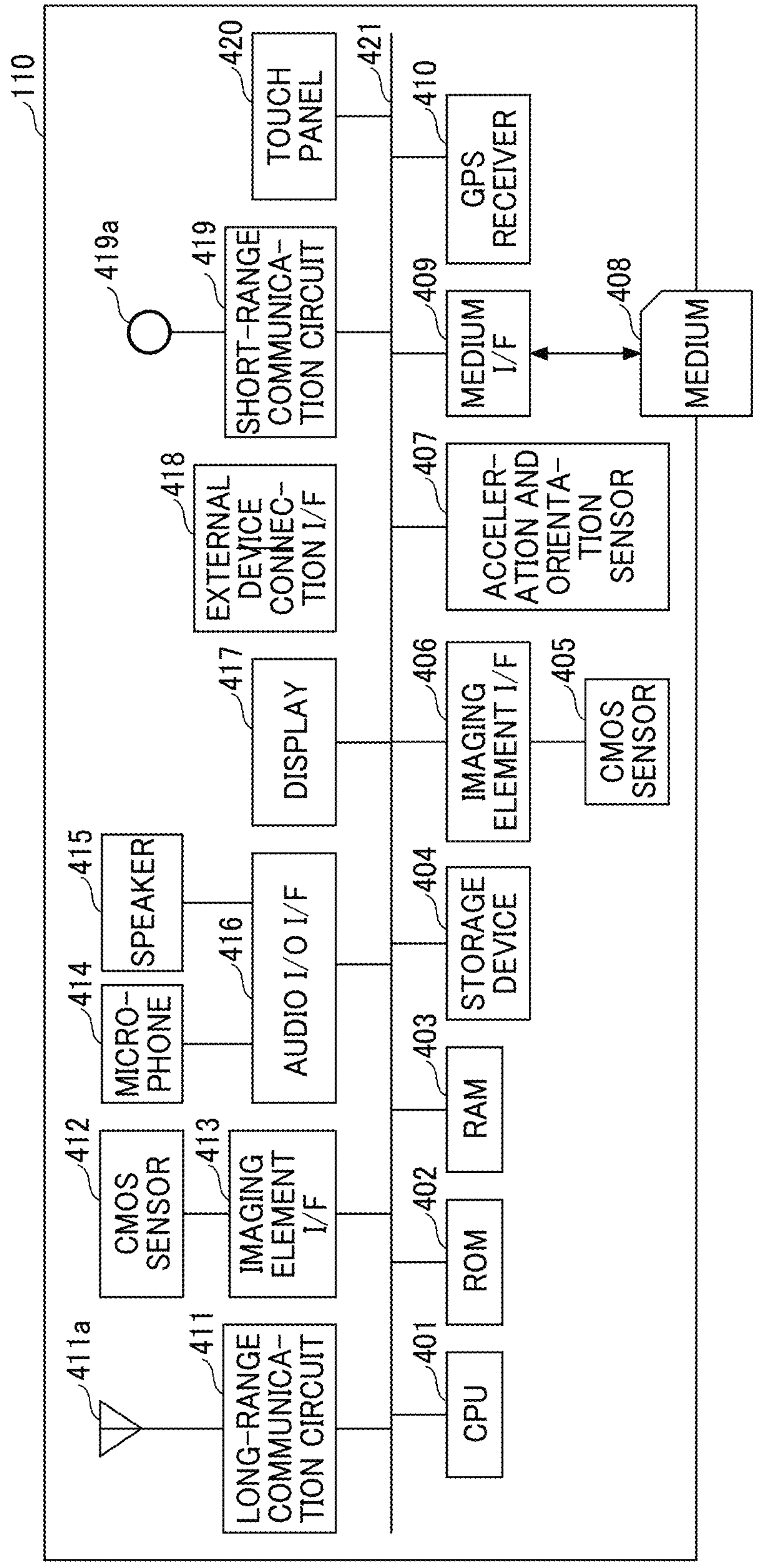
FIG. 4 is a diagram illustrating an example of a hardware configuration of the terminal according to embodiments of the present disclosure.

FIG. 4 is a diagram illustrating an example of a hardware configuration of a terminal according to embodiments of the present disclosure. The following describes an example of the hardware configuration of the terminal 110 in case that the terminal 110 is an information terminal such as a smartphone or tablet terminal. The terminal 110 may be an electronic device equipped with a computer configuration such as a video meeting device or IWB and web meeting functions, for example. The administrator terminal 101 may also have the hardware configuration of a computer 300 as shown in FIG. 3.

In the example shown in FIG. 4, terminal 110 includes CPU 401, ROM 402, RAM 403, storage device 404, CMOS sensor 405, imaging element I/F 406, acceleration and orientation sensor 407, medium 408, medium I/F 409, Global Positioning System (GPS) receiver 410.

Of these, the CPU 401 controls the operation of the entire terminal 110 by executing a predetermined program. In an exemplary implementation, CPU 401 may include or be encompassed by circuits, processing circuits or processing circuitry, which will be discussed later. The ROM 402 stores programs used to start the CPU 401, such as IPL. The RAM 403 is used as a work area for the CPU 401. The storage device 404 is a mass storage device for storing programs such as OS, applications, and various data, etc., and is realized by, for example, Solid State Drive (SSD) or flash ROM.

The CMOS sensor 405 is a kind of built-in image capturing device that captures a subject (mainly a self-portrait image) and obtains image data in accordance with the control of the CPU 401. The terminal 110 may have an imaging device such as a CCD sensor instead of the CMOS sensor 405. The imaging element I/F 406 is a circuit that controls the drive of the CMOS sensor 405. The acceleration and orientation sensor 407 is an electronic magnetic compass, gyrocompass, acceleration sensor, or other various sensors that detect geomagnetism. The medium I/F 409 controls the reading or writing (storage) of data to medium (storage media) 408 such as flash memory, etc. The GPS receiver 410 receives GPS signals (positioning signals) from GPS satellites.

The terminal 110 also includes a long-range communication circuit 411, an antenna 411*a* of the long-range communication circuit 411, a CMOS sensor 412, an imaging element I/F 413, a microphone 414, a speaker 415, an audio I/O I/F 416, a display 417, an external device connection I/F 418, a short-range communication circuit 419, an antenna 419*a* of the short-range communication circuit 419, and a touch panel 420.

Among these, the long-range communication circuit 411 is a circuit that communicates with other devices via, for example, a communication network 2. The CMOS sensor 412 is a kind of built-in image capturing device that captures a subject and obtains image data in accordance with the control of CPU 401. The imaging element I/F 413 is a circuit that controls the drive of the CMOS sensor 412. The microphone 414 is a built-in circuit that converts sound into electrical signals. The speaker 415 is a built-in circuit that converts electrical signals into physical vibrations to produce sounds such as music and voice. The audio I/O I/F 416 is a circuit that processes the input and output of sound signals to/from the microphone 414 and speaker 415 in accordance with the control of CPU 401.

Display 417 is a type of display device such as liquid crystal or organic Electro Luminescence (EL) that displays images of the subject, various icons, etc. The external device connection I/F 418 is an interface for connecting various external devices. The short-range communication circuit 419 includes a circuit for short-range wireless communication. The touch panel 420 is a kind of input device by which a user operates the terminal 110 by pressing the display 417.

The terminal 110 also includes a bus line 421. The bus line 421 includes address buses, data buses, and the like for electrically connecting each component such as the CPU 401 shown in FIG. 4.

The hardware configuration of the terminal 110 shown in FIG. 4 is an example. The terminal 110 may have other hardware configurations as long as it has a computer configuration, communication circuits, display, microphone, and speakers.

<Functional Configuration>

Figure 5:
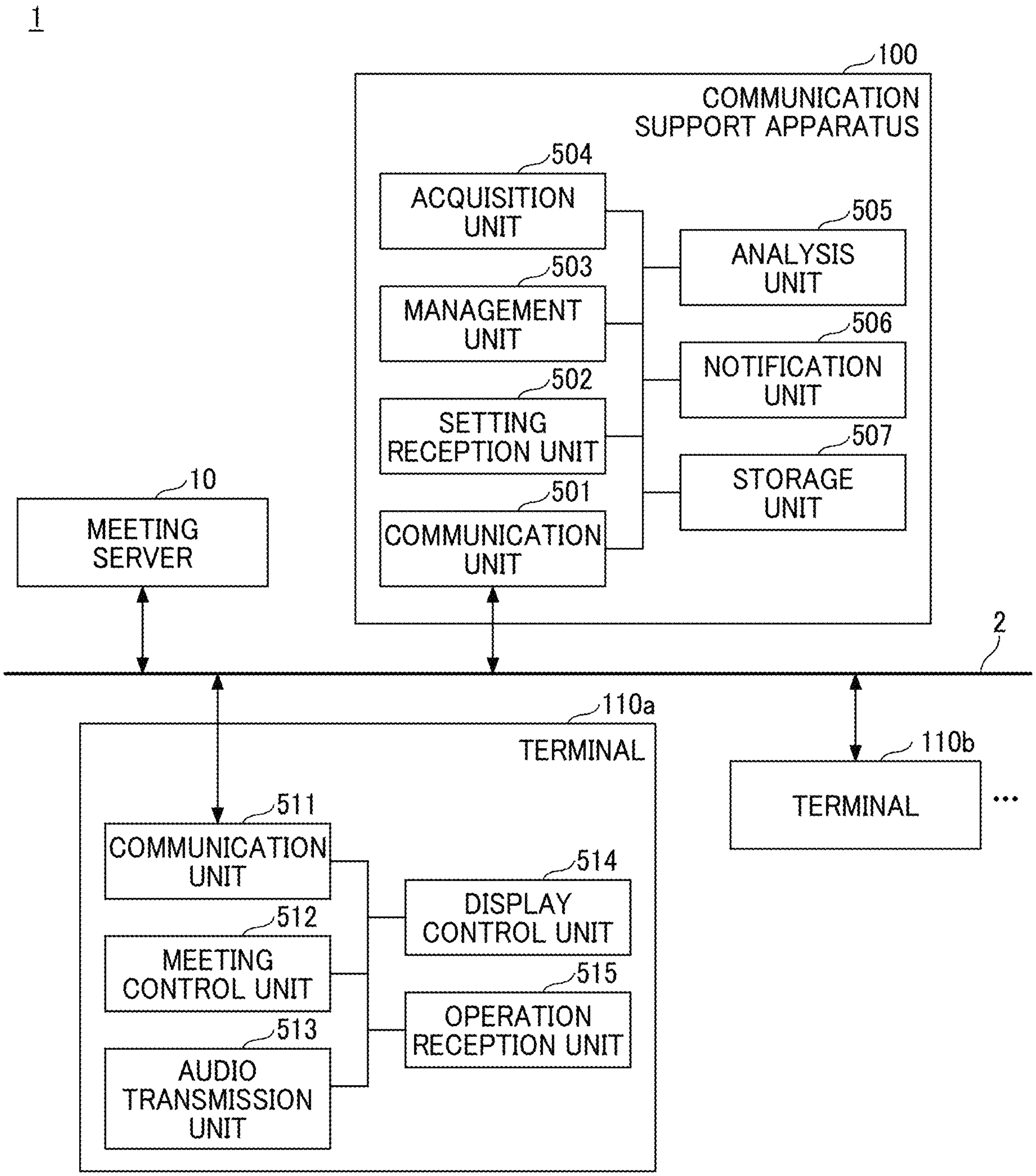
FIG. 5 is a diagram illustrating an example of a functional configuration of the communication support system according to embodiments of the present disclosure.

The functional configuration of the communication support system 1 is described below. FIG. 5 is diagram illustrating an example of a functional configuration of the communication support system 1 according to embodiments of the present disclosure. The following describes the case where the communication support system 1 has the system configuration shown in FIG. 1.

(Functional Configuration of Communication Support Apparatus)

The communication support apparatus 100 realizes the communication unit 501, the setting reception unit 502, the management unit 503, the acquisition unit 504, the analysis unit 505, and the notification unit 506, etc., by executing predetermined programs in one or more computers 300. Alternatively, at least some of each of the above functional configurations may be realized by hardware.

The communication support apparatus 100 also realizes the storage unit 507, for example, by a storage device such as the HD 304 and the HDD controller 305.

The communication unit 501 connects the communication support apparatus 100 to the communication network 2 using the network I/F 308, etc., and executes communication processing to communicate with the terminal 110, etc.

The settings reception unit 502 executes a settings reception process that receive settings for the communication support system 1. For example, the setting reception unit 502 receives setting information from the terminal 110, such as keywords set by participants, scheduled meeting time, and reminder timing, by the operation screen displayed on the terminal 110.

The management unit 503 stores and manages various information about the communication support system in the storage unit 507. For example, the setting information received by the setting reception unit 502 such as keywords set by participants, scheduled meeting time, or reminder timing, etc., are stored and managed in the storage unit 507.

The acquisition unit 504 executes an acquisition process to acquire audio of a participant in a web meeting (hereinafter referred to as "meeting") and audio of other participants in the meeting. For example, the acquisition unit 504 acquires the audio of the participant and the audio of other participants that are sent to the communication support apparatus 100 by the audio transmission unit 513 of the terminal 110 used by the participant (e.g., terminal 110*a*). Note that web meeting and meeting are examples of communication.

The analysis unit 505 executes an analysis process to analyze the audio acquired by the acquisition unit 504. For example, the analysis unit 505 converts the audio of the participant, the audio of other participants, or the audio of the participant and the other participants into text. Based on the textualized audio, The analysis unit 505 analyzes whether or not word related to keywords managed by the management unit 503 were made in the meeting.

As an example, the analysis unit 505 searches whether the textualized audio contains the keywords managed by the management unit 503, and determine that the word related to the keywords was not made in the meeting if the audio does not contain the keywords.

As another example, the analysis unit 505 may interpret the a purpose or intent of the audio converted into text using the purpose or intent interpretation technique used by chatbots, etc., and determine that a suggested word related to the keywords was not made in the meeting if the suggested word was not made.

The notification unit 506 executes a notification process to notify the participant of a reminder regarding the keywords before the meeting ends based on the analysis results of the analysis unit 505, if the word related to the keywords was not made in the meeting.

The storage unit 507 stores various information including various configuration information managed by the management unit 503, data, and programs, for example.

The various functional configurations that the communication support apparatus has may be possessed by the terminal 110.

(Functional Configuration of the Terminal)

The terminal 110 realizes, for example, a communication unit 511, a meeting control unit 512, an audio transmission unit 513, a display control unit 514, and an operation reception unit 515, by executing the predetermined programs in the CPU 301 (or CPU 401). Alternatively, at least some of the above functional configurations may be realized by hardware. The terminal 110 used by other participants (e.g., terminal 100B) may or may not have the audio transmission unit 513.

The communication unit 511, for example, uses the network I/F 308 (or the long-range communication circuit 411) to connect the terminal 110 to the communication network 2 and perform communication process to communicate with the meeting server 10, the communication support apparatus 100, and other terminals 100, etc.

The meeting control unit 512, for example, connects to the meeting server 10 using the communication unit 511 to send and receive meeting video (or meeting audio). The meeting control unit 512 also performs input and output of meeting audio using the audio I/O I/F 323 (or audio I/O I/F 416) and output of meeting video using the display 306 (or display 417). The processes executed by the meeting control unit 512 may be the same as those for general web meeting.

The audio transmission unit 513 acquires the audio of a participant in the meeting (e.g., a user using the terminal 110*a*) and the audio of other participants in the meeting (e.g., a user using the terminal 100*b*), and send them to the communication support apparatus 100. For example, the audio transmission unit 513 acquires audio, such as audio acquired by a microphone and audio output from a speaker, from the audio I/O I/F 323 (or audio I/O I/F 416), and send the acquired audio (audio data) to the communication support apparatus 100. In this case, the communication support apparatus 100 is not limited to web meeting, but can also support communication such as normal meetings.

However, not limited to this, the audio transmission unit 513 may acquire the audio of the participant and the audio of other participants from the meeting control unit 512 and send the acquired audio (audio data) to the communication support apparatus 100.

The display control unit 514 executes display control process to display, for example, a User Interface (UI) screen such as the operation screen described below and a support window displaying the reminder on a display unit such as the display 306 (or display 417).

The operation reception unit 515 executes operation reception process to receive operations by users (participant, etc.) using the terminal 110. For example, the operation reception unit 515 receives input operations, etc. on the UI screen displayed by the display control unit 514.

In the example shown in FIG. 5, the meeting server 10 can be a general cloud service that provides web meeting services.

<Process Flow>

The following describes the process flow of this communication support method.

First Embodiment (Support Process)

Figure 6:
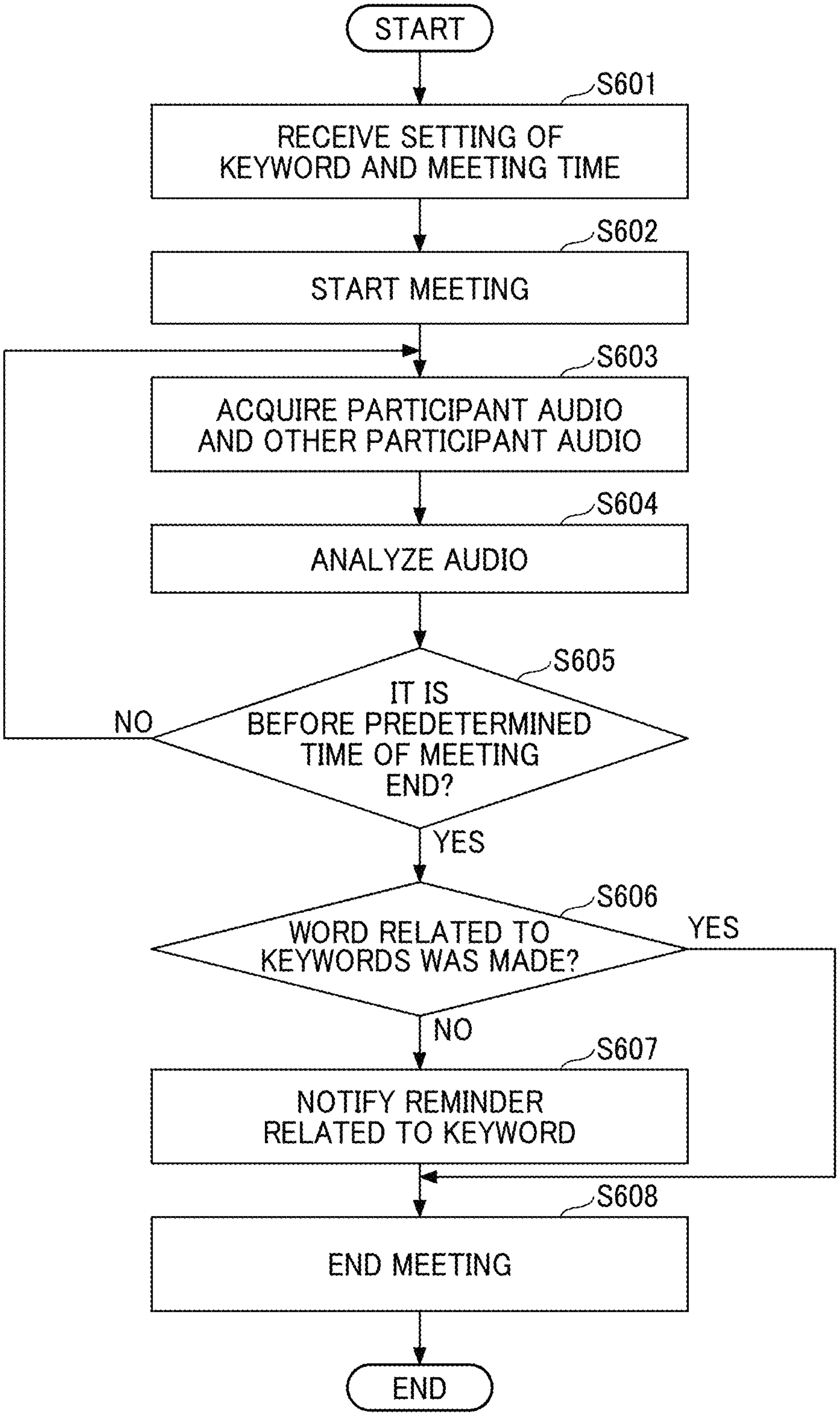
FIG. 6 is a flowchart illustrating an example of support process according to the first embodiment.

FIG. 6 is a flowchart illustrating an example of the support process according to the first embodiment. This process is an example of the support process by which the communication support system 1 with the functional configuration shown in FIG. 5 supports communication (meeting).

In step S601, the setting reception unit 502 receives setting information such as keywords and scheduled meeting time by the participant in the meeting.

Figure 7A:
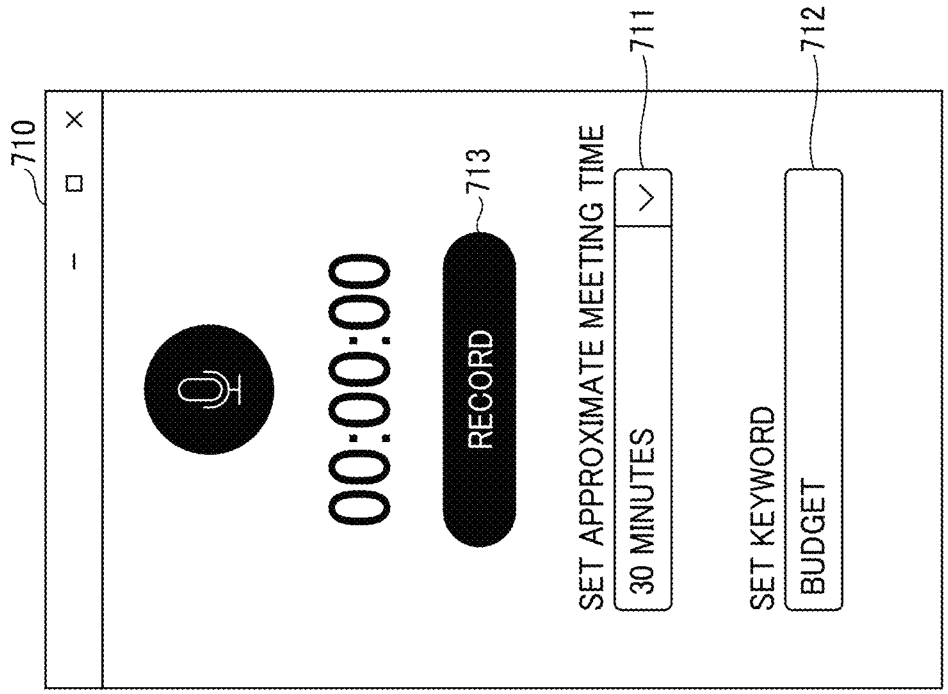
FIGS. 7A and 7B are diagrams illustrating an example of an operation screen according to the first embodiment.
Figure 7B:
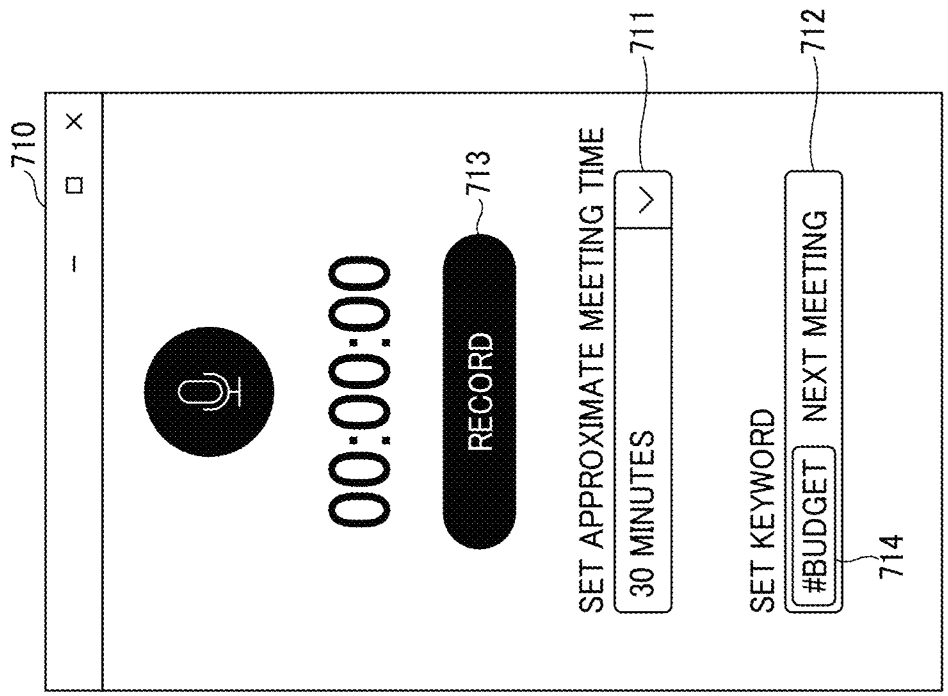

For example, the participant using the terminal 110*a* can start an application for the communication support system 1 on the terminal 110*a* to display the operation screen 710 as shown in FIGS. 7A and 7B.

In the example in FIGS. 7A and 7B, the operation screen 710 displays a setting field 711 for setting the scheduled meeting time and a setting field 712 for setting keywords. The participant can set the scheduled meeting time (e.g., 15 minutes, 30 minutes, 45 minutes, 1 hour, etc.) using the setting field 711. The participant can also set keywords using the setting field 712.

As a specific example, when a participant enters the keyword (e.g., "budget") in the setting field 712 regarding a matter to be confirmed in the meeting and presses the Enter key or the like, the entered keyword is displayed in the setting field 712 as tag 714, for example. By repeating the same operation, the participant can enter multiple keywords in the setting field 712.

When the participant selects the "Record" button 713 after setting the scheduled meeting time and keywords, the operation reception unit 515 sends the set scheduled meeting time and keywords to the communication support apparatus 100. The setting reception unit 502 of the communication support apparatus 100 receives the settings of the scheduled meeting time and keywords received from the terminal 100*a*.

In step S602, for example, a meeting is started between the terminal 100*a* used by the participant and the terminals 100*b*, used by other participants. For example, the participant uses the terminal 100*a* to participate in a web meeting provided by the meeting server 10 to start a meeting with other participants who participate in the same web meeting using the terminals 100*b*. Alternatively, the communication support system 1 may perform the process of step S601 after step S602.

In step S603, the acquisition unit 504 acquires the audio of the participant in the meeting and the audio of the other participants in the meeting. For example, the acquisition unit 504 acquires the audio (audio data) of the participant and the other participants that are sent by the audio transmission unit 513 of the terminal 110*a*.

In step S604, the analysis unit 505 executes an analysis process to analyze the audio acquired by the acquisition unit 504. For example, the analysis unit 505 converts the audio of the participant, the audio of the other participant, or the audio of the participant and the other participant into text, and analyzes whether or not word related to the keywords managed by the management unit 503 was made in the meeting based on the audio converted into text.

In step S605, the analysis unit 505 determines whether it is before predetermined time of the meeting end. For example, the analysis unit 505 calculates the meeting end time from the scheduled meeting time received by the setting reception unit 502, and determines whether or not it is before the predetermined time (e.g., 5 minutes before) of the calculated meeting end time.

Figure 8:
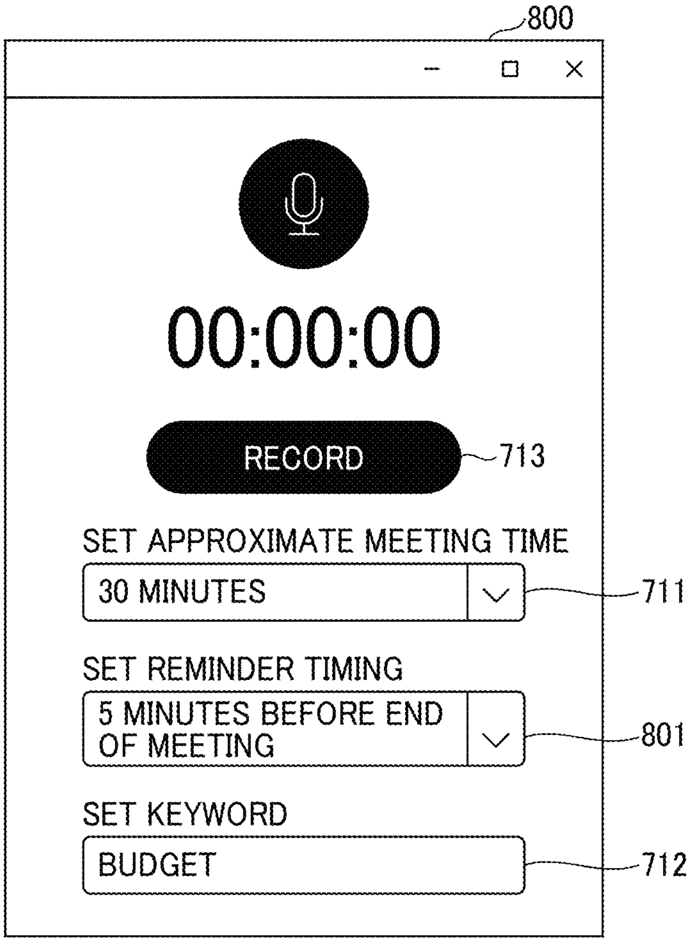
FIG. 8 is a diagram illustrating an example of an operation screen according to the first embodiment.

Here, the predetermined time may, for example, be set in advance in the communication support apparatus 100, or it may be set by the participant using, for example, the operation screen 800 as shown in FIG. 8. In the example in FIG. 8, a setting field 801 for setting the reminder timing is added to the operation screen 800. The participant may set the predetermined time using this setting field 801.

If it is not before the predetermined time of the meeting end, the analysis unit 505 returns the process to step S603. On the other hand, if it is before the predetermined time of the meeting end, the analysis unit 505 moves the process to step S606.

Upon moving to step S606, the analysis unit 505 determines whether or not the word related to the keywords was made in the meeting. If the word related to the keywords was not included in the audio converted into text, the analysis unit 505 moves the process to step S607. On the other hand, if word related to the keywords was included in the audio converted into text, the analysis unit 505 moves the process to step S608.

Figure 9:
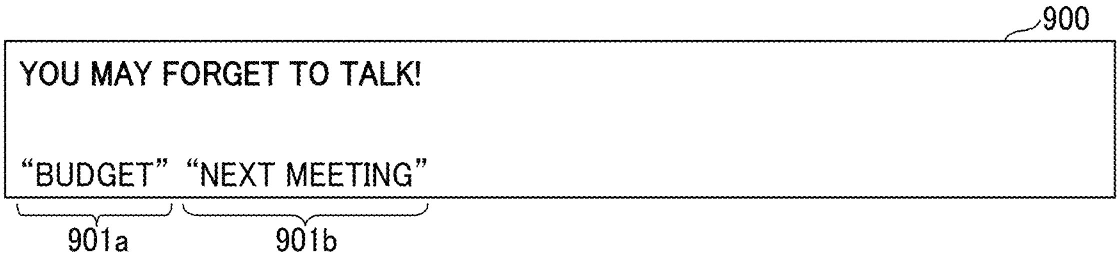
FIG. 9 is a diagram illustrating an image of a support window according to the first embodiment.

In step S607, the notification unit 506 notifies the reminder regarding a keyword that was not made in the meeting. For example, if the keywords "budget" and "next meeting" was not made in the meeting, the notification unit 506 notifies the terminal 100*a* of information for displaying a pop-up window 900, as shown in FIG. 9, on the terminal 100*a* used by the participant. Upon receiving the notification, the display control unit 514 of the terminal 100*a* displays the support window 900 on the display of the terminal 100*a*.

FIG. 9 is a diagram illustrating an image of the support window according to the first embodiment. In the example of FIG. 9, the support window 900 displays keywords 901*a* and 901*b* that was not made in the meeting. The notification unit 506, for example, displays such a support window 900 on the terminal 100*a* of the participant. The support window 900 is an example of the reminder regarding the keywords that was not made in the meeting. For example, the notification unit 506 may notify the participant of the reminder regarding the keywords that was not made in the meeting by e-mail, chat application, or the like.

The meeting between the terminal 100*a* used by the participant and the terminals 100*b*, used by other participants end. As described above, the communication support system 1 of this embodiment can notify the participant of the reminder regarding the keywords that have was not made, before the meeting end, if the word related to the keywords registered in advance was not made in the meeting.

Thus, according to this embodiment, it is possible to provide the communication support system that prevents communication from ending without realizing that there are things that have been forgotten to be talk or ask.

Second Embodiment

In the first embodiment, the communication support system 1 notifies the participant of keywords that was not made, if the participant and other participants had not made the set keywords.

The second embodiment describes an example in which a speaker is identified and when the identified speaker (e.g., a participant or other participants) has not made the predetermined keywords in the meeting, the reminder regarding the keywords that was not made is notified to the participant.

Figure 10:
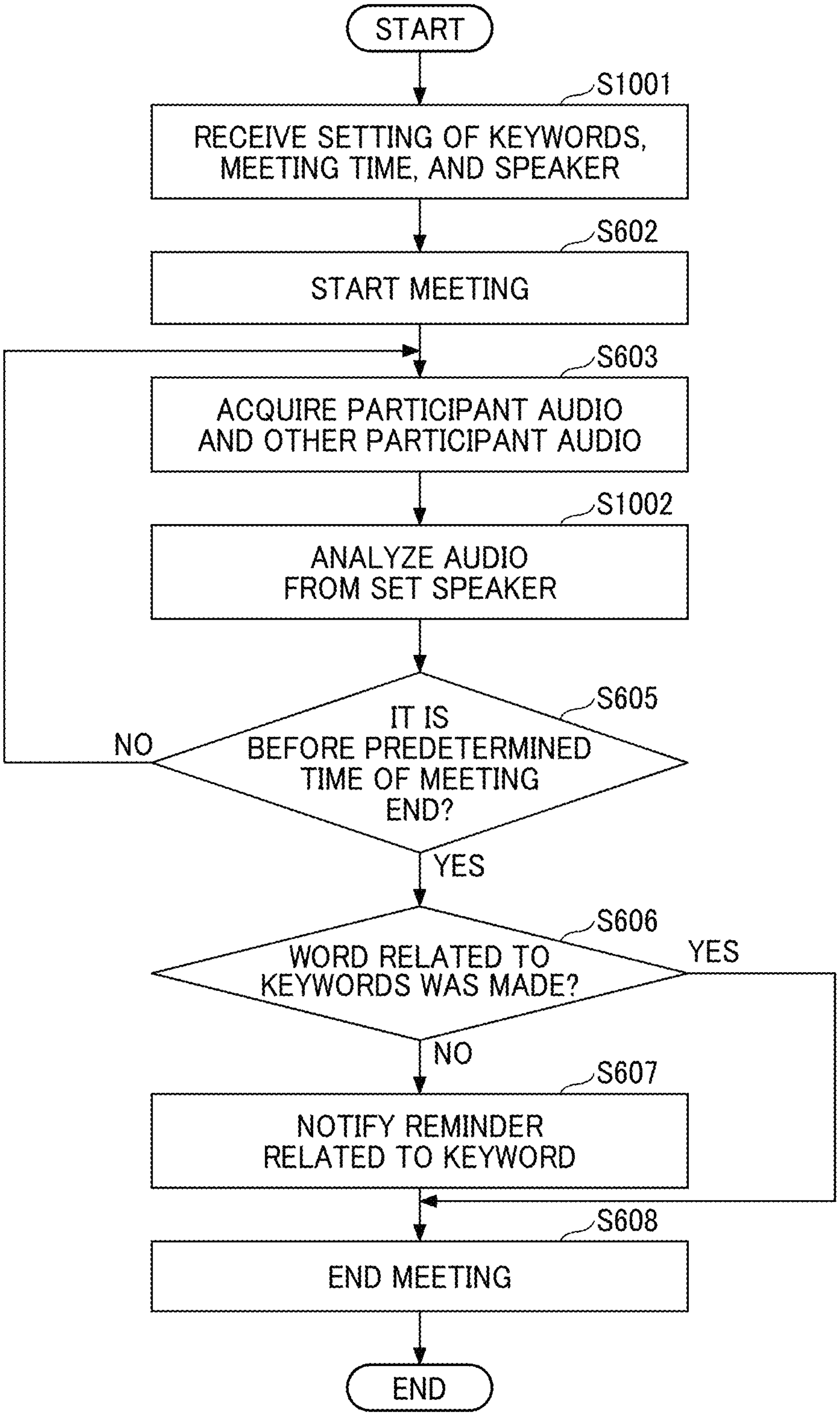
FIG. 10 is a flowchart illustrating an example of support processing according to the second embodiment.

FIG. 10 is a flowchart illustrating an example of the support process for the second embodiment. This process is another example of a support process by which the communication support system 1 with the functional configuration shown in FIG. 5 supports communication (meeting). The basic process may be the same as the support process for the first embodiment described in FIG.

In step S1001, the setting reception unit 502 receives the settings of the speaker in addition to the settings of keywords and the scheduled meeting time, etc. by the participant in the meeting.

Figure 11:
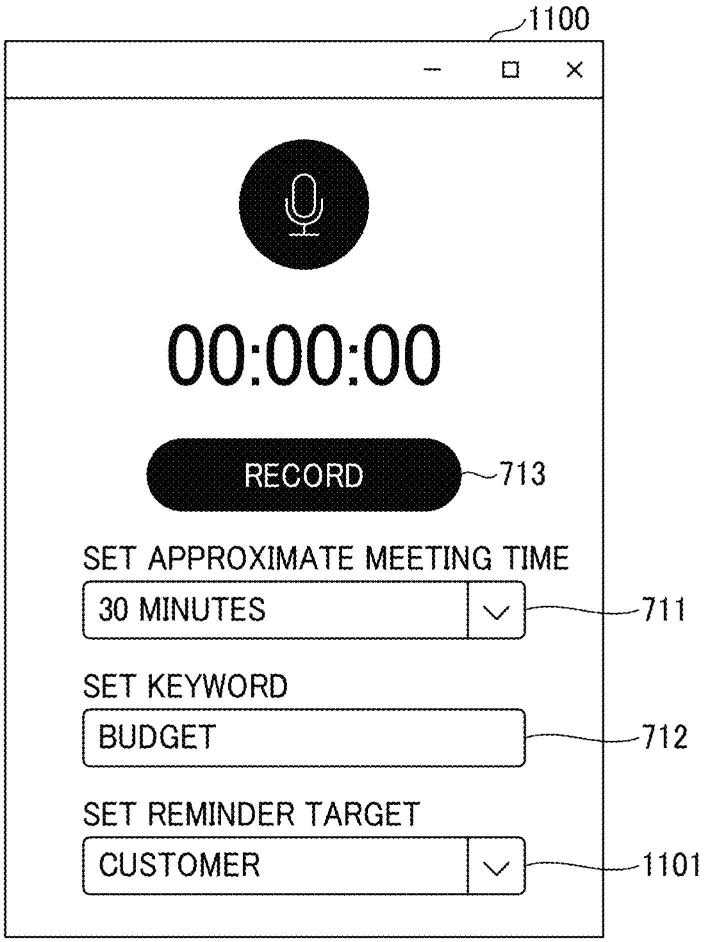
FIG. 11 is a diagram illustrating an example of an operation screen according to the second embodiment.

For example, a participant using terminal 110*a* can display the operation screen 110 shown in FIG. 11 by starting an application for communication support system 1 on terminal 110*a*.

FIG. 11 is a diagram illustrating an example of the operation screen according to the second embodiment. In the example of FIG. 11, the operation screen 1100 displays a setting field 1101 for setting the target of the reminder, in addition to a setting field 711 for setting the scheduled meeting time and a setting field 712 for setting keywords. The setting field 711 for setting the scheduled meeting time and the setting field 712 for setting keywords are similar to the setting field 711 and the setting field 712 described in FIGS. 7A and 7B, so they are not explained here.

The participant can set whether the speaker to be the target of the reminder is the participant, other participants, or both the participant and other participants using the setting field 1101 for setting the target of the reminder.

When the participant selects the "Record" button 713 after setting the scheduled meeting time, keywords, and the speaker to be the target of the reminder, the operation reception unit 515 sends the scheduled meeting time, keywords, and the speaker to be the target of the reminder to the communication support apparatus 100. The setting reception unit 502 of the communication support apparatus 100 receives the settings of the scheduled meeting time, keywords, and the speaker to be the target of the reminder from the terminal 100*a*.

The process of steps S602 and S603 may be the same as the process of steps S602 and S603 described in FIG. 6.

In step S1002, the analysis unit 505 executes an analysis process to analyze the audio of the speaker who is the target of the reminder set in step S1001 among the audio of the participant and the audio of other participants acquired by the acquisition unit 504. For example, the analysis unit 505 converts the audio of the speaker who is the target of the reminder into text, and based on the audio converted into text, analyzes whether or not the word related to keywords managed by the management unit 503 was made in the meeting.

The process of steps S605-S608 may be similar to the process of steps S605-S608 described in FIG. 6.

If the participant sets the speaker to be the target of the reminder (e.g., a sales representative, etc.) by the process in FIG. 10, the notification unit 506 notifies the participant of the reminder regarding the keywords if the participant has not made any word regarding the keywords in the meeting. Similarly, if the participant sets the speaker to be the target of the reminder to other participants (e.g., a customer, etc.), the notification unit 506 notifies the participant of the reminder regarding the keywords when other participant has not made any word regarding the keywords in the meeting.

Third Embodiment

In the first and second embodiments, the communication support system 1 notified the participants of reminders regarding keywords at the predetermined time before the end of the meeting. However, in an actual meeting, the meeting may end earlier than the scheduled time. Therefore, the third embodiment describes an example in which the communication support system 1 notified the participants of reminders regarding keywords when the communication support system 1 receives a predetermined operation by the participant.

Figure 12:
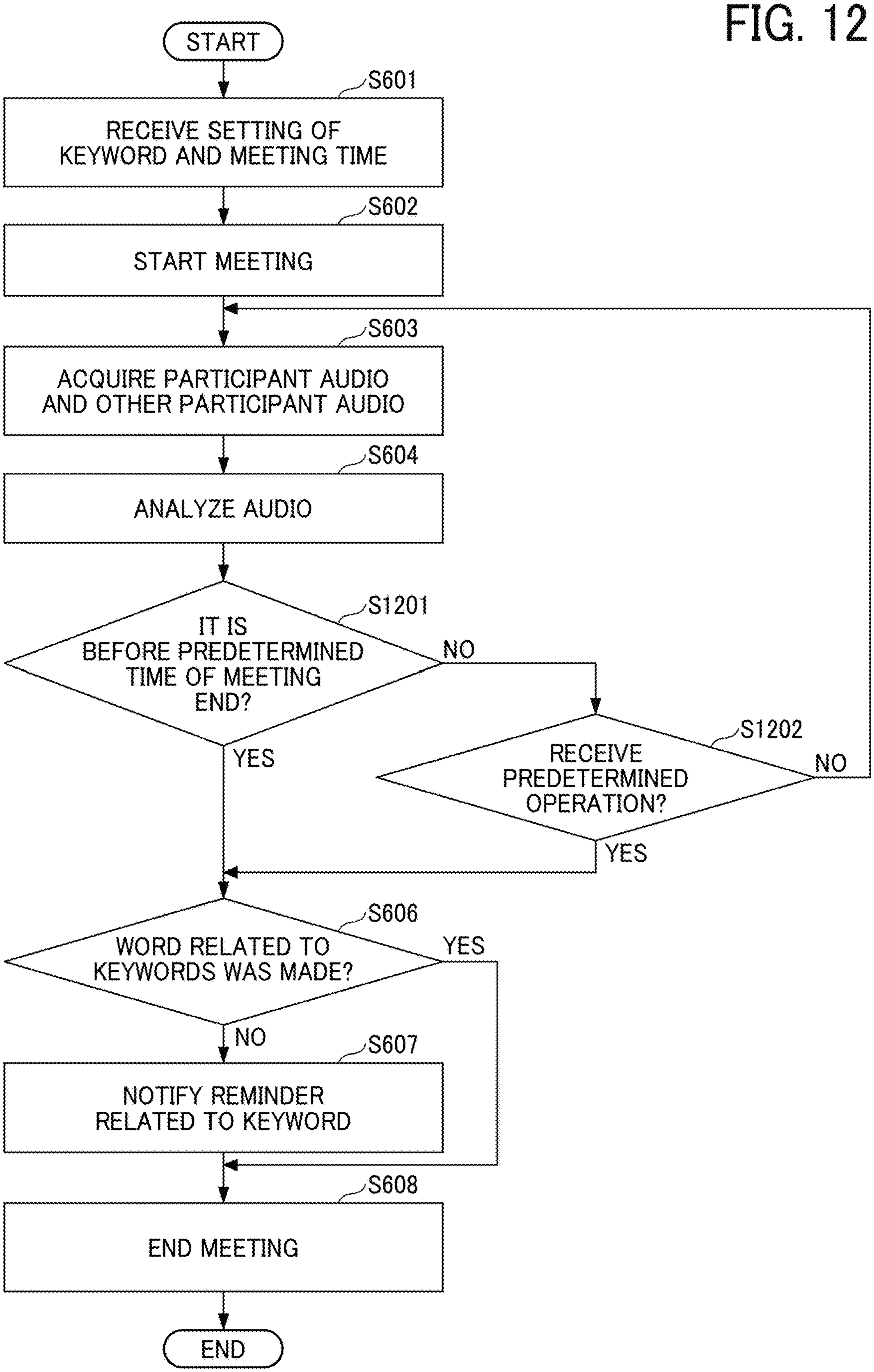
FIG. 12 is a flowchart illustrating an example of support process according to the third embodiment.

FIG. 12 is a flowchart illustrating an example of the support process according to the third embodiment.

This process is an another example of the support process by which the communication support system 1 with the functional configuration shown in FIG. 5 supports communication (meeting). The basic content of the process may be the same as the support process for the first embodiment described in FIG. 6.

The processing of steps S601 to S604 may be the same as the processing of steps S601 to S604 described in FIG. 6.

In step S1201, the analysis unit 505 determines whether it is before a predetermined time of the meeting end, similar to the processing in step S605 of FIG. 6. If it is before the predetermined time of the meeting end, the analysis unit 505 moves the process to step S606. On the other hand, if it is not before the predetermined time of the meeting end, the analysis unit 505 moves the process to step S1202.

Moving to step S1202, the analysis unit 505 determines whether or not the predetermined operation is received. For example, the display control unit 514 of the terminal 100*a* displays the operation screen 1300 shown in FIG. 13 on the display of the terminal 100*a* when the "record" button 713 is selected on the operation screen 710 as shown in FIGS. 7A and 7B.

Figure 13:
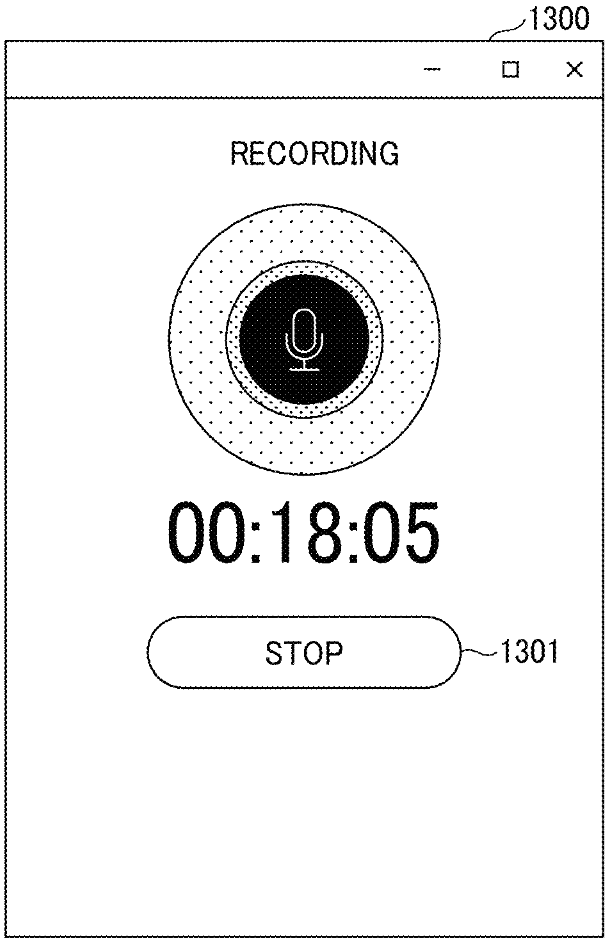
FIG. 13 is a diagram illustrating an example of an operation screen according to the third embodiment.

In the example of FIG. 13, the "stop" button 1301 is displayed on the operation screen 1300. For example, when the "record" button 713 is selected on the operation screen 710 as shown in FIGS. 7A and 7B, the acquisition unit 504 of the communication support apparatus 100 starts recording the audio of participant and the audio of other participants acquired by the acquisition unit 504. When the "stop" button 1301 is selected on the operation screen 1300 as shown in FIG. 13, the acquisition unit 504 stops recording the audio of participant and the audio of other participants acquired by the acquisition unit 504.

Figure 14:
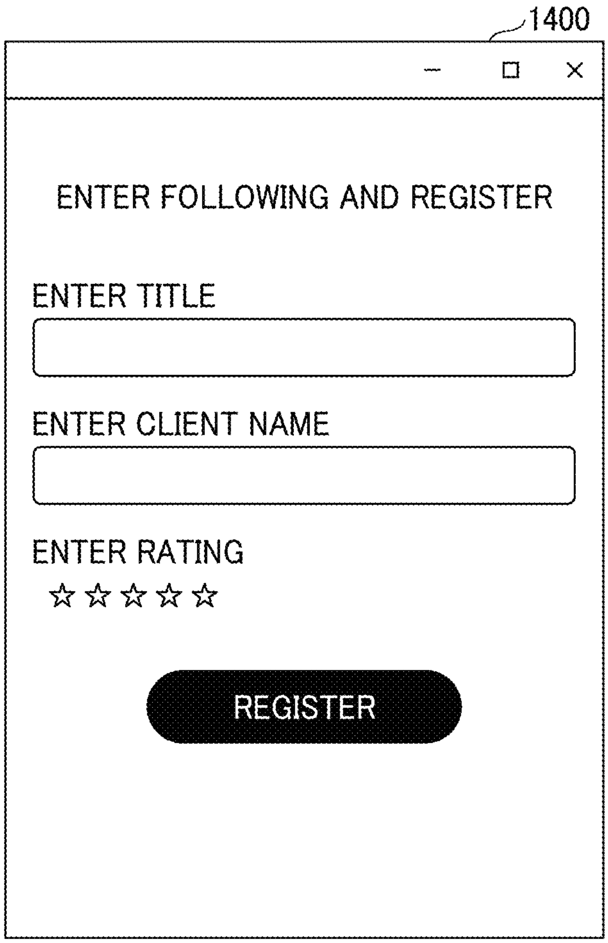
FIG. 14 is a diagram illustrating an example of an operation screen according to the third embodiment.

Preferably, when the "stop" button 1301 is selected, the terminal 100*a* displays the operation screen 1400 as shown in FIG. 14, for example, to receive the setting of information about the acquired audio. This allows the communication support system 1 to add and manage information such as, for example, title, client name, or rating to the acquired audio.

The analysis unit 505 determines that the predetermined operation is received when, for example, the "stop" button 1301 is selected on the operation screen 1300 as shown in FIG. 13. However, not limited to this, the analysis unit 505 may determine that the predetermined operation is received when a predetermined button, such as the "Confirm" button or the "Remind" button, for example, is selected on the operation screen.

If the predetermined operation is not received, the analysis unit 505 returns the process to step S603. On the other hand, if the predetermined operation is received, the analysis unit 505 moves the process to step S606. The processing of steps S606 to S608 may be the same as the processing of steps S606 to S608 described in FIG. 6.

The processing of steps S1201 and 1202 in FIG. 12 is an example. The communication support system 1 may omit processing step S1201 in FIG. 12, as shown in FIG. 15.

Figure 15:
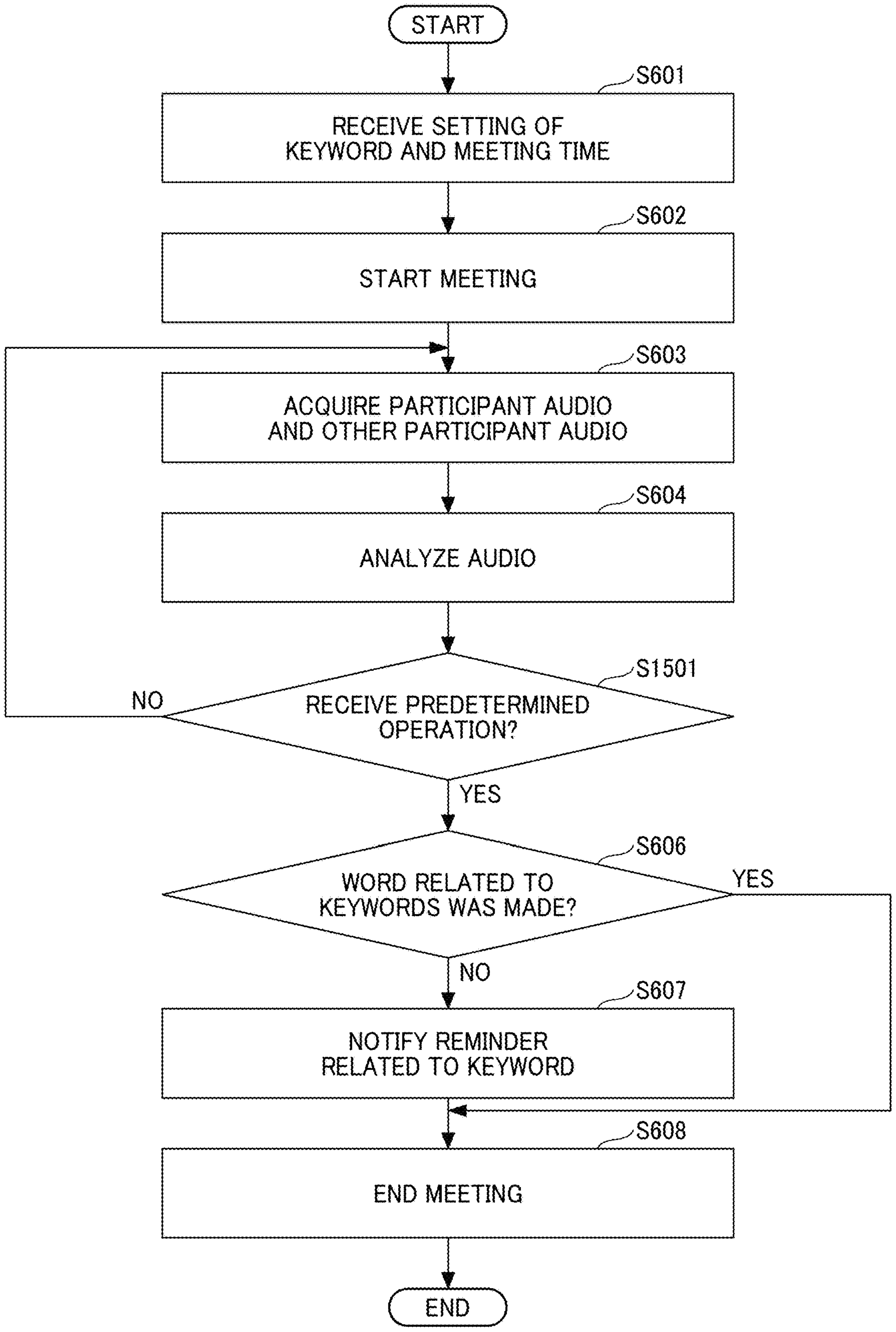
FIG. 15 is a flowchart illustrating another example of support process according to the third embodiment.

In the example in FIG. 15, in step S1501, the analysis unit 505 determines whether or not the predetermined operation is received. If the predetermined operation is not received, the analysis unit 505 returns the process to step S603. On the other hand, if the predetermined operation is received, the analysis unit 505 moves the process to step S606.

The processes in FIGS. 14 and 15 allow the communication support system 1 to notify participant of reminder regarding keywords that have not been made in the meeting before the meeting ends, even when the meeting ends earlier than the scheduled time. The third embodiment can also be applied in combination with the second embodiment.

Fourth Embodiment

The fourth embodiment describes an example of process when the communication support system 1 has a determination unit that determines a predetermined time indicating the timing of the reminder.

<Functional Configuration>

Figure 16:
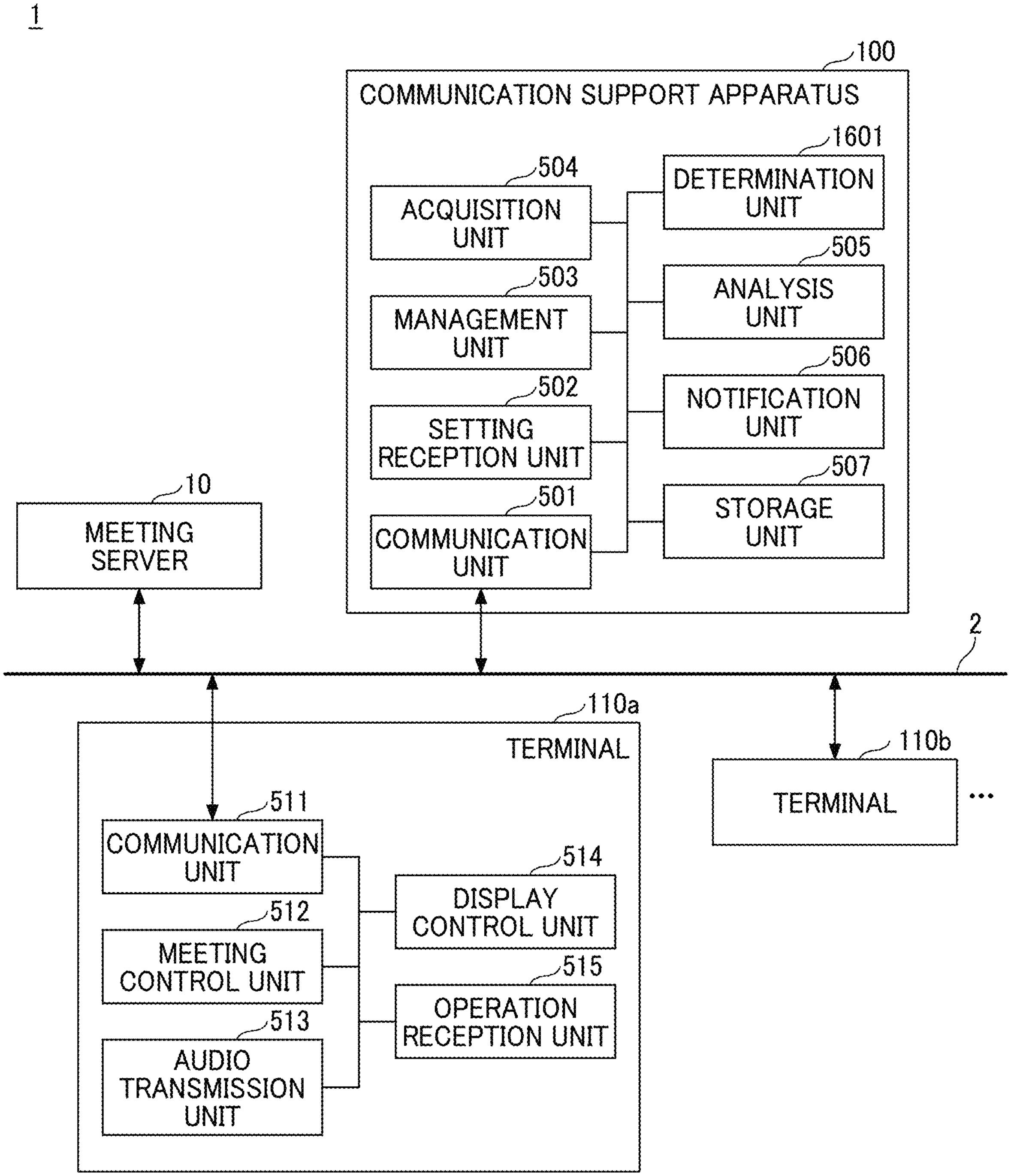
FIG. 16 is a diagram illustrating an example of a functional configuration of a communication support system according to a fourth embodiment.

FIG. 16 is a diagram illustrating an example of a functional configuration of the communication support system 1 for the fourth embodiment. As shown in FIG. 16, the communication support apparatus 100 for the fourth embodiment has a determination unit 1601 in addition to the functional configuration of the communication support apparatus 100 described in FIG. 5.

The determination unit 1601 is realized, for example, by a program executed by the CPU 301. The determination unit 1601 executes, for example, a determination process to determine a predetermined time indicating the timing of the reminder regarding in accordance with the keywords or the number of keywords set by the participant.

For example, if there is only one item to be confirmed, it may be possible to confirm within 5 minutes, but if there are multiple items to be confirmed, it may be difficult to confirm within 5 minutes. Therefore, the determination unit 1601 may determine the predetermined time so that the predetermined time becomes longer as the number of keywords regarding the item to be confirmed increases.

If the item to be confirmed is a simple matter such as "next meeting", it may be possible to confirm within 5 minutes, but if the item is a complex matter such as "budget", it may be difficult to confirmed within 5 minutes. Therefore, the determination unit 1601 may change the predetermined time according to the keywords.

Preferably, the determination unit 1601 determines the predetermined time using a machine learning model that has been learned in advance to determine the predetermined time in accordance with the keywords or the number of keywords. In this case, the machine learning model may be stored in the memory 507 of the communication support apparatus 100, or the machine learning model provided by a cloud service outside the system may be used.

The machine learning is a technology that allows computers to acquire human-like learning capabilities. It refers to a technology in which a computer autonomously generates algorithms necessary for making decisions such as data identification from previously collected training data, and applies the algorithms to new data to make predictions. The learning method for machine learning can be supervised learning, unsupervised learning, semi-supervised learning, reinforcement learning, or deep learning, or even a combination of these learning methods. Any learning method for machine learning is acceptable.

Preferably, when multiple keywords are set, the determination unit 1601 determines a different predetermined time for each keyword. For example, if two keywords "budget" and "next meeting" are set, the determination unit 1601 may determine the predetermined time so that a reminder regarding "budget" is given 10 minutes before the end time of the meeting and a reminder regarding "next meeting" is given 5 minutes before the end time of the meeting.

The functional configuration of the communication support system 1 for the fourth embodiment, other than the determination unit 1601, may be the same as the functional configuration of the communication support system 1 according to embodiment described in FIG. 5.

<Process Flow>

Figure 17:
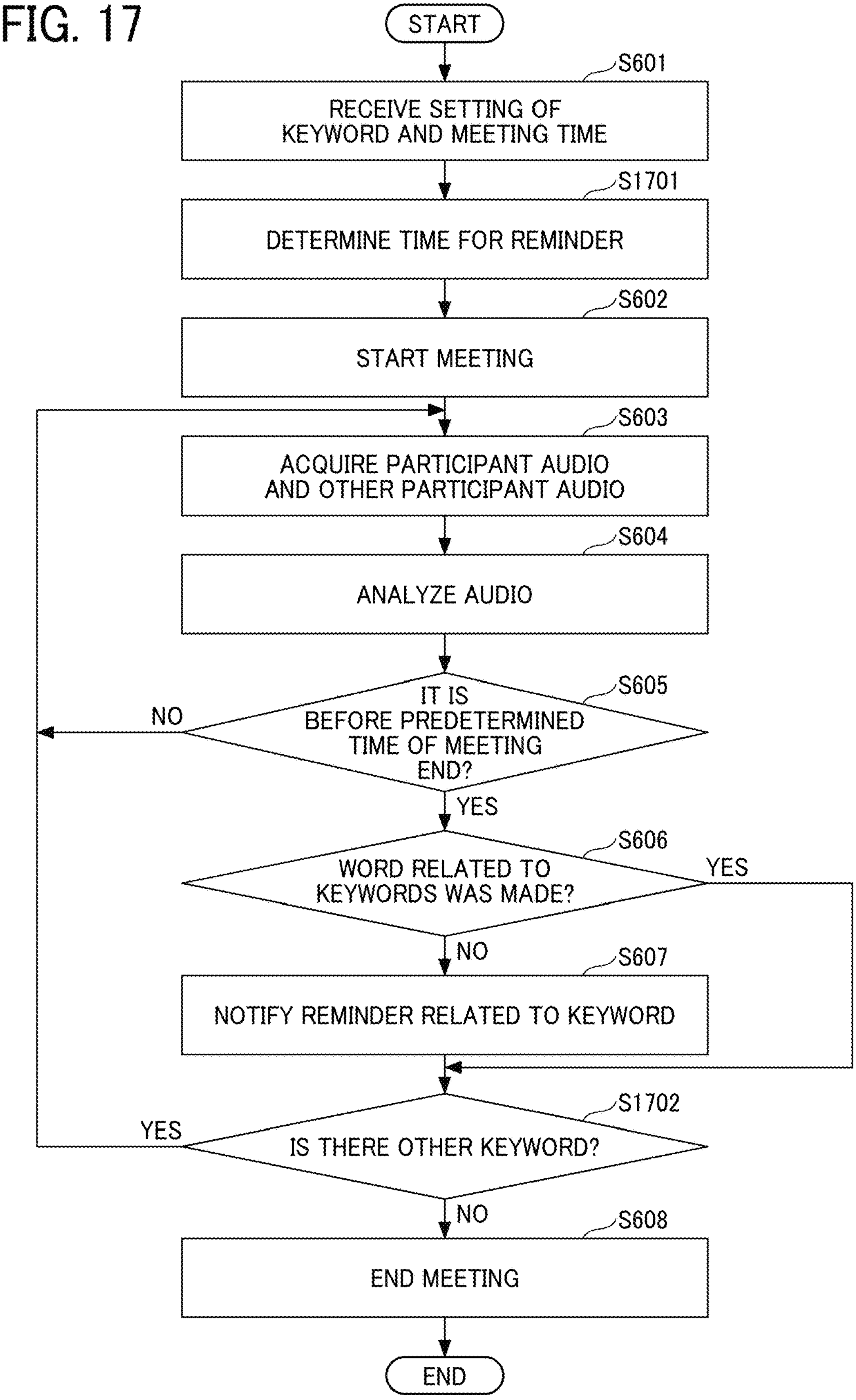
FIG. 17 is a flowchart illustrating an example of support processing according to the fourth embodiment.

FIG. 17 is a flowchart illustrating an example of the support process according to the fourth embodiment. This process shows, for example, another example of a support process in which the communication support system 1 having the functional configuration shown in FIG. 16 supports communication (meetings). The basic content of the process may be similar to the support process for the first embodiment described in FIG. 6.

The processing of step S601 may be the same as the processing of step S601 described in FIG. 6.

In step S1701, the determination unit 1601 determines a predetermined time for reminding based on the keywords or the number of keywords received by the setting reception unit 502. Preferably, when multiple keywords are set, the determination unit 1601 determines the predetermined time for each keyword.

The processing of steps S602 to S607 may be the same as the processing of steps S602 to S607 described in FIG. 6.

In step S1702, the communication support apparatus 100 determines whether there is other keyword for which the predetermined time has not been reached. If there is other keyword, the communication support apparatus 100 returns the process to step S603. On the other hand, if there is no other keyword, the communication support apparatus 100 moves the process to step S608.

The processing of step S608 may be the same as the processing of step S608 described in FIG. 6.

The process in FIG. 17 allows the communication support system 1 to automatically determine the predetermined time to remind the keywords according to the keywords or the number of keywords set by the participant. The fourth embodiment can be applied in combination with the first to third embodiment.

(Variation 1)

In steps S601 and S1701 of FIG. 17, the setting reception unit 502 may receive the setting of a predetermined time for each keyword in addition to the setting of the keyword and the scheduled meeting time.

In this case, for example, the display control unit 514 of the terminal 100*a* displays on the operation screen a setting field for setting keywords and a setting field for setting the predetermined time for each keyword. The setting reception unit 502 also receives the keywords and the predetermined time set on the operation screen.

(Variant 2)

The communication support system 1 may identify other participants when multiple other participants are participating in a meeting. For example, if other participants A and B are participating in the meeting, the communication support system 1 may notify the participant of the reminder indicating that the other participant A has not made any has not made any word regarding the keywords.

The method of identifying other participants may be, for example, by the terminal 100 used by the other participants, or by applying a known speaker recognition technique to the audio of the other participants to identify the other participants.

According to the above, each of the embodiments of the invention can provide a communication support system that prevents communication from end without realizing that there are things that have been forgotten to be talk or ask.

SUPPLEMENTATION

Each function of each embodiment described above can be realized by one or more processing circuits. The term "processing circuit" as used herein refers to a processor programmed to perform each function by software, such as a processor implemented by an electronic circuit, or a processor designed to perform each function described above, such as an Application Specific Integrated Circuit (ASIC), digital signal processor (DSP), field programmable gate array (FPGA), or other device designed to perform the functions described above.

The group of devices described in the examples is only one of several computing environments for implementing the embodiments disclosed herein. In one embodiment, the communication support apparatus 100 includes a plurality of computing devices, such as a server cluster. The plurality of computing devices are configured to communicate with each other via any type of communication link, including networks, shared memory, etc., to perform the processing disclosed herein.

Further, the meeting server 10, communication support apparatus 100, and terminal 110 can be configured to share the disclosed processing steps, e.g., the processes shown in FIGS. 6, 10, 12, 15, and 17, in various combinations. For example, the process executed by the communication support apparatus 100 can be executed by the meeting server 10 or the terminal 110. In addition, each element of the communication support apparatus 100 can be grouped in a single server device or divided into multiple devices.

APPENDIX

The following communication support system, communication support apparatus, communication support method, and non-transitory recording medium are disclosed herein.

Aspects of the present disclosure are, for example, as follows.

According to a first aspect, the communication support system comprising circuitry configured to manage keyword, acquire audio of participant in a communication, and notify, by analyzing the audio the participant of a reminder regarding the keyword before the communication is ended, in case that no word regarding the keywords has been made in the communication.

According to a second aspect, the communication support system of the first aspect, wherein the circuitry is further configured to notify the participant of the reminder regarding the keyword in case that the participant has not made word regarding the keyword in the communication.

According to a third aspect, the communication support system of the first aspect, wherein the circuitry is further configured to acquire the audio of other participant in the communication, notify the participant of the reminder regarding the keyword in case that the other participant has not made the word regarding the keyword in the communication.

According to a fourth aspect, the communication support system of the first aspect, wherein the circuitry is further configured to display an operation screen for setting the keyword on a terminal used by the participant According to a fifth aspect, the communication support system of the fourth aspect, wherein the operation screen includes a setting field for setting the keyword, the circuitry is further configured to manage the keyword set on the operation screen.

According to a sixth aspect, the communication support system of the fourth aspect, wherein the operation screen include a setting field for setting a scheduled time of the communication, the circuitry is further configured to notify the participant of the reminder regarding the keyword based on the scheduled time.

According to a seventh aspect, the communication support system of the sixth aspect, wherein the circuitry is further configured to notify the participant of the reminder regarding the keyword a predetermined time before a scheduled end time of the communication.

According to an eighth aspect, the communication support system of the seventh aspect, wherein the operation screen include a setting field for setting the predetermined time.

According to a ninth aspect, the communication support system of the eighth aspect, wherein the operation screen include a setting field for setting one or more keywords, the circuitry is further configured to determine the predetermined time based on the one or more keywords or the number of the keywords.

According to a tenth aspect, the communication support system of the fourth aspect, wherein the circuitry is further configured to notify the participant of the reminder regarding the keywords in case that a predetermined operation is received on the operation screen.

According to an eleventh aspect, the communication support system of the fourth aspect, wherein the circuitry is further configured to convert the audio into text, and notify the participant of the reminder regarding the keywords before the communication end in case that text does not include the keyword.

According to a twelfth aspect, the communication support system of the fourth aspect, wherein the circuitry is further configured to interpret the intent of the audio by analyzing the audio, and notify the participant of the reminder regarding the keyword before the communication end, in case that the audio does not include word with the intent for the keyword.

According to a thirteenth aspect, the communication support apparatus comprising circuitry configured to manage keyword, acquire audio of participant in a communication, and notify, by analyzing the audio, the participant of a reminder regarding the keyword before the communication is ended, in case that no word regarding the keywords has been made in the communication.

According to a fourteenth aspect, the communication support method comprising steps of managing keyword, acquiring audio of participant in a communication; and notifying, by analyzing the audio, the participant of a reminder regarding the keyword before the communication is ended, in case that no word regarding the keywords has been made in the communication.

The invention claimed is:

1. A communication support system, comprising:
circuitry configured to:
manage a plurality of keywords;
control a display to display an operation screen including a setting field for setting any of the plurality of keywords;
acquire audio of one or more participants in a communication;
determine, by analyzing the audio, whether or not each of the plurality of keywords is made in the communication;
determine, using a pre-trained machine learning model trained in advance, a predetermined time in accordance with the keywords or a number of keywords, wherein
the predetermined time is before a scheduled end time of the communication, and
a different predetermined time is determined for each keyword of the plurality of keywords; and
in a case that the circuitry determines that a keyword of the plurality of keywords has not been made in the communication, notify a participant of the one or more participants at the respective predetermined time determined for the keyword that the keyword has not been made in the communication.

2. The communication support system of claim 1, wherein the circuitry is further configured to notify the one or more participants that the keyword has not been made in the communication.

3. The communication support system of claim 1, wherein
the communication is made during a meeting between the one or more participants, and
the circuitry is further configured to:
acquire the audio each participant of the one or more participants in the meeting; and
notify the participant that the keyword has not been made during the meeting.

4. The communication support system of claim 1, wherein the circuitry is further configured to notify the participant regarding the plurality of keywords in a case that a predetermined operation is received on the operation screen.

5. The communication support system of claim 1, wherein the circuitry is further configured to:
convert the audio into text; and
notify the participant regarding the keyword before the communication ends in a case that the text does not include the keyword.

6. The communication support system of claim 1, wherein the circuitry is further configured to:
interpret a suggested keyword of the audio by analyzing the audio; and
notify the participant of a reminder regarding the suggested keyword before an end of the communication in a case that the audio does not include the suggested keyword.

7. The communication support system of claim 1, further comprising:
a memory, wherein
the circuitry manages the plurality of keywords by storing the one or more keywords in the memory.

8. The communication support system of claim 7, wherein the circuitry is further configured to store the audio in the memory in association with the plurality of keywords.

9. The communication support system of claim 1, wherein to notify the participant, the circuitry is configured to control the display to display the keyword.

10. The communication support system of claim 1, wherein the circuitry is configured to notify each participant of the one or more participants of the keyword in the case that the circuitry determines that the keyword has not been made in the communication.

11. The communication support system of claim 1, wherein the circuitry is further configured to receive the plurality of keywords prior to start of the communication.

12. The communication support system of claim 11, wherein the circuitry receives the plurality of keywords from a participant of the one or more participants.

13. A communication support method, comprising:
managing a plurality of keywords;
controlling a display to display an operation screen including a setting field for setting any of the plurality of keywords;
acquiring audio of one or more participants in a communication;
determining, by analyzing the audio, whether or not each of the plurality of keywords is made in the communication;
determining, using a pre-trained machine learning model trained in advance, a predetermined time in accordance with the keywords or a number of keywords, wherein
the predetermined time is before a scheduled end time of the communication, and
a different predetermined time is determined for each keyword of the plurality of keywords; and
in a case that the determining indicates that a keyword of the plurality of keywords has not been made in the communication, notifying a participant of the one or more participants at the respective predetermined time determined for the keyword that the keyword has not been made in the communication.

14. A non-transitory computer readable medium storing computer executable instructions which, when executed by circuitry of a communication support system, cause the communication support system to perform a process comprising:
managing a plurality of keywords;
controlling a display to display an operation screen including a setting field for setting any of the plurality of keywords;
acquiring audio of one or more participants in a communication;
determining, by analyzing the audio, whether or not each of the plurality of keywords is made in the communication;
determining, using a pre-trained machine learning model trained in advance, a predetermined time in accordance with the keywords or a number of keywords, wherein the predetermined time is before a scheduled end time of the communication, and a different predetermined time is determined for each keyword of the plurality of keywords; and in a case that the determining indicates that a keyword of the plurality of keywords has not been made in the communication, notifying a participant of the one or more participants at the respective predetermined time determined for the keyword that the keyword has not been made in the communication.

* * * * *